United States Patent [19]

Schneider

[11] 4,337,857

[45] Jul. 6, 1982

[54] STEPPED GRATE-TYPE COOLER FOR HOT PARTICLES

[75] Inventor: Richard Schneider, Wermelskirchen, Fed. Rep. of Germany

[73] Assignee: Klockner-Humboldt-Deutz AG, Fed. Rep. of Germany

[21] Appl. No.: 209,319

[22] Filed: Nov. 24, 1980

Related U.S. Application Data

[63] Continuation of Ser. No. 24,900, Mar. 29, 1979, abandoned, which is a continuation of Ser. No. 758,807, Jan. 12, 1977, abandoned.

[30] Foreign Application Priority Data

Feb. 6, 1976 [DE] Fed. Rep. of Germany ....... 2604611

[51] Int. Cl.$^3$ ............................................ B65G 25/00

[52] U.S. Cl. ...................................... 198/773; 34/164; 110/290; 110/328

[58] Field of Search ................................ 198/773–775; 110/281, 289–291, 328; 34/164; 165/92, 116, 120; 414/156

[56] References Cited

U.S. PATENT DOCUMENTS

| | | | |
|---|---|---|---|
| 2,846,778 | 8/1958 | Markle, Jr. | 34/164 |
| 3,197,887 | 8/1965 | Kayatz | 34/164 |
| 3,255,867 | 6/1966 | Allen et al. | 198/773 |
| 3,321,845 | 5/1967 | Boron | 34/164 |
| 3,374,553 | 3/1968 | Gillman | 34/164 |
| 3,624,920 | 12/1971 | Coutelan | 34/164 |
| 3,753,299 | 8/1973 | Schreiner | 34/237 |
| 3,827,159 | 8/1974 | Venanzetti | 34/164 |
| 3,871,287 | 3/1975 | Spillman et al. | 110/8 |
| 3,961,588 | 6/1976 | Bode et al. | 110/38 |

*Primary Examiner*—Joseph E. Valenza

*Attorney, Agent, or Firm*—Hill, Van Santen, Steadman, Chiara & Simpson

[57] ABSTRACT

A stepped grate-type cooler of the type employing a plurality of spaced grate plate carriers, alternate carriers being stationary and the carriers positioned between the stationary carriers being reciprocable relative thereto. Each of the grate plate carriers includes transversely extending carrier beams with carrier fingers extending therefrom. A plurality of grate plates is carried by each of the carrier fingers, and the clearance between the stationary carrier beam and a reciprocable carrier beam is greater than the width of each of the grate plates in a region extending from the mid position of the reciprocable carriers to either extreme end of the reciprocation travel of the carriers. With this type of structure, it is considerably more convenient to remove individual grate plates since this can be accomplished from the bottom rather than going through the hot gases in the cooler.

2 Claims, 3 Drawing Figures

STEPPED GRATE-TYPE COOLER FOR HOT PARTICLES

RELATED APPLICATIONS

This application is a continuation of application Ser. No. 24,900 filed Mar. 29, 1979 which is a continuation of application Ser. No. 758,807 filed on Jan. 12, 1977 both now abandoned.

BACKGROUND OF THE INVENTION

1. Field of the Invention

This invention is in the field of stepped grate-type cooler assemblies wherein stationary grate plates cooperate with reciprocable grate plates to move the particles therealong, and the spatial arrangement is such that individual grate plates can be readily removed for replacement.

2. Description of the Prior Art

In any grate cooler, the heat exchange between the material being cooled and the cooling medium consisting of air takes place above a grate system which divides the cooler into an upper hot gas chamber and a housing base portion acted upon by the air. The grate system normally consists of a plurality of stationary and a plurality of movable grate plate carriers on each of which there are fixed several grate plates having cooling air apertures provided therein. The stationary rows of grate plates are alternated with reciprocable rows of grate plates, the various grate plates being fixed on fingers or the like extending from beams. Through the oscillating movement of all of the reciprocable rows of grate plates, the material to be cooled is transported from one end of the cooler to the other.

The grate plates, particularly those located in the recuperation zone of the cooler on which the hot material is charged undergo conditions of high wear, due to thermal and mechanical stresses. It is therefore necessary periodically to replace such individual grate plates. Damaged grate plates previously had to be released from their particular grate plate carriers and carried out from above through the hot gas chamber. It was accordingly necessary with the exchange of even a single grate plate to shut off the rotary kiln, empty the grate cooler and await the cooling off of the hot brick refractory lining of the hot gas chamber. Consequently, a long interruption of the operation of the installation was necessary before entry into the hot gas chamber and exchange of the plate could be accomplished. In addition, an exchange of grate plates of the discharge zone of the rotary kiln was particularly dangerous due to the possible dropping of glowing pieces of clinker. Such grate plates could not be removed from the bottom of the cooler because of the configuration of the carrier fingers on which the grate plates were disposed.

In order to make possible an exchange of worn grate plates from the cool, lower side of the grate, it was known from German Pat. No. 1,134,329 to construct the grate plates in two parts with a short front part which is wear resistant and heat resistant and which because of its shortness could be exchanged downwardly between the carrier fingers of the grate plate carriers. Such a two-part grate plate construction is relatively complicated and expensive. With such an installation, it is still not possible to exchange other portions of the grate plates, or indeed the entire grate plate downwardly through the cooler grate.

To make possible the exchange of entire grate plate assemblies from below a cooler grate, it is known from German Laid Open Specification No. 2,000,631 to utilize transversely lying carrier beams as grate plate carriers, and omit the carrier fingers extending in the direction of the grate feed. With these grate plates, however, only about half of the grate plate length is supported while the front half of the grate plate lies unsupported. To make the freelying grate portion resistant to bending, it is made arcuate and is reinforced by means of side flanges and ribs. These grate plates are expensive and heavy and the costs, therefore, are very high. Accordingly, these grate plates are usually inserted only in the recuperation zone of the grate cooler inlet. Such a grate cooler is therefore equipped with two different types of grate plate carrier systems and grate plate types, and accordingly the necessity of maintaining double replacement parts results in additional costs.

SUMMARY OF THE INVENTION

The present invention provides an improved grate cooler assembly having relatively simple grate plates, which lie securely on grate plate carriers provided with carrier fingers, the grate plates being exchangeable from below the cooler grate. In the grate cooler of the present invention, the clearance between two adjacent grate plate carrier beams is greater than the width of each grate plate in a region extending from the mid-position of the reciprocable carrier to either the extreme left-hand or extreme right-hand portions of the carrier travel.

With the improved grate cooler of the present invention, it is possible to release each grate plate from the cooler by rotating the plate approximately 90° in its plane and then tilting the same out downwardly in an approximately vertical position through the resultant opening between two carrier fingers and between the clearance spacing between two adjacent grate plate carrier beams. Through this simple and rapid exchange of grate plates, the shutdown time of the rotary kiln and the grate cooler can be appreciably lowered as the cooling chambers which are acted upon by cooling air below the cooler grate require only a short cooling period, and a cooling of the refractory brick work of the hot gas chamber above the cooling grate is not required. The exchange of grate plates from below the cooling grate is further without danger. The convenient exchange of grate plates according to the present invention is possible despite the presence of grate plate fingers which make possible the utilization of considerably cheaper and lightweight grate plates. The grate cooler in accordance with the present invention is equipped with only a single grate plate carrier system and a grate plate system, and still offers the advantages of facilitating exchange of each individual grate plate from the base or bottom part of the housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

Figure 1:
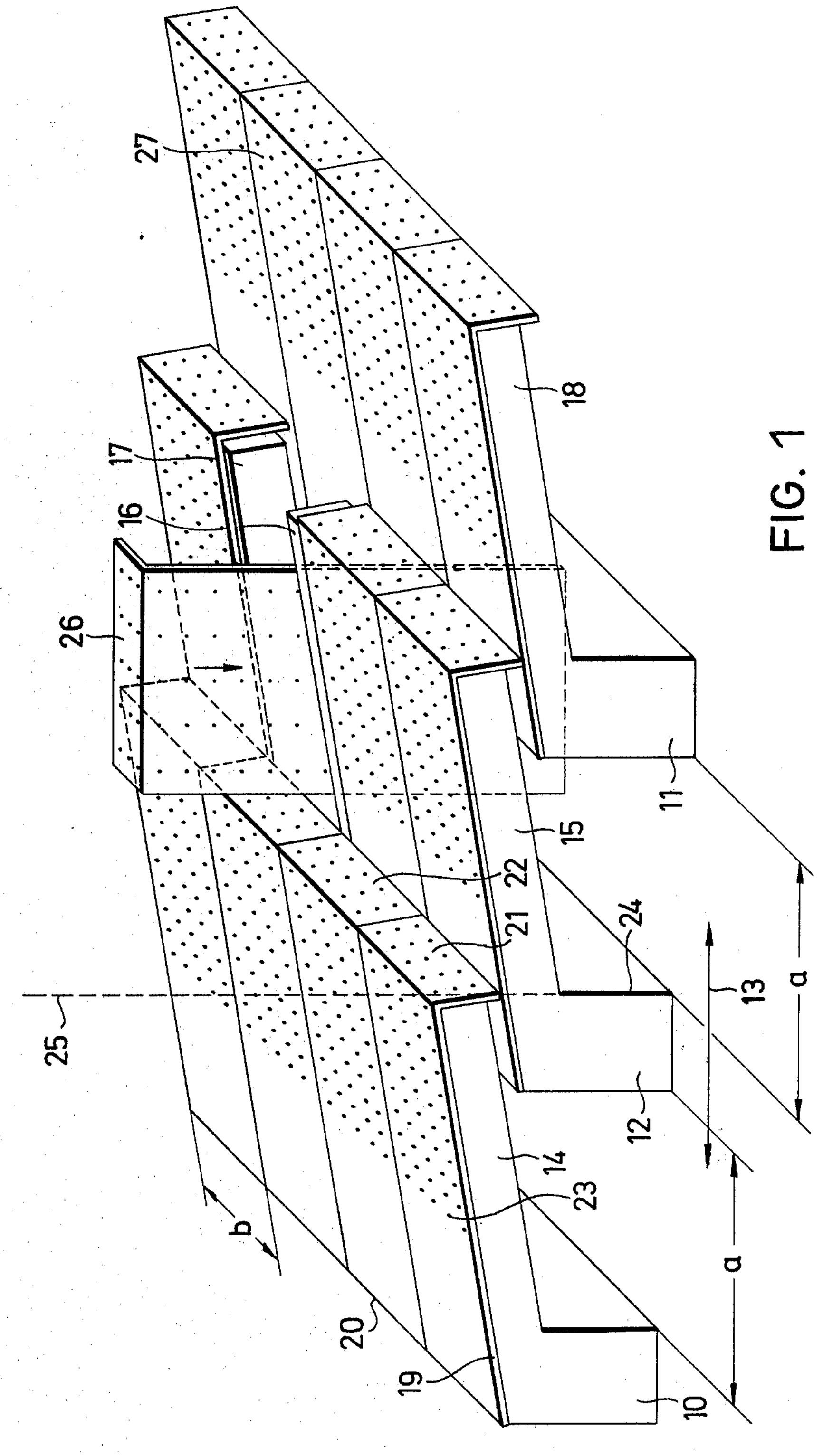
FIG. 1 is a perspective view of a portion of a grate cooler employing the improvements of the present invention.

The grate cooler of FIG. 1 is the type which could be used for the cooling of cement clinkers issuing from a rotary kiln. It has exchangeable stationary grate plate carrier beams 10 and 11 extending transversely to the direction of material feed, and carrier beams 12 reciprocable in the direction of particle feed. The stationary carrier beams 10 and 11 are fixed to the lower part of the cooler housing, while all of the movable carrier beams 12 (only one of which is shown) are fixed to a common thrust frame or carriage and reciprocated in the direction of the arrow 13 from an extreme left-hand position in which the beam 12 is fairly close to the stationary beam 10, and a right-hand position in which the carrier beam 12 is close to the carrier beam 11. On all of the carrier beams there is disposed a plurality of carrier fingers extending in a slightly upwardly inclined position. Thus, on carrier beam 10, there is a carrier finger 14 and on the carrier beam 12 there are the carrier fingers 15, 16 and 17. A carrier finger 18 is shown extending from the carrier beam 11. Between each two carrier fingers there extends a comparably thin walled grate plate, for example, grate plates 19 and 20. The grate plates have downwardly facing forward flange portions 21 and 22 which are received against the ends of the carrier fingers. All grate plates are fixed from below by means of screw bolts or the like on the carrier fingers or on the carrier beams, respectively. The grate plates on one carrier beam laterally overlap the grate plates on the next adjacent carrier beam, as shown in FIG. 1. All of the grate plates are provided with apertures or perforations 23 through which cooling air can flow from below. By means of the reciprocating movement of the movable carrier beam 12, the hot cement clinker located on the grate plates is fed step-by-step to a discharge in the left to right direction as seen in FIG. 1.

For the exchange of worn grate plates from below the cooling grate, the individual grate plates cannot be simply tilted downward, as the width b of the grate plates must be greater than the spacing of two adjacent carrier fingers from one another, as for example, carrier fingers 16 and 17 so that the grate plates may lie on their marginal edges still safely supported on the carrier fingers. In accordance with the present invention, the clearance spacing a between two adjacent grate plate carrier beams is at least greater than the width b of each grate plate when the movable carrier beam 12 is in its center position as illustrated in FIG. 1. In the embodiment shown in FIG. 1, the downwardly facing flange portions 21 and 22 of the grate plates 19 and 20 lie with their forward edges in the same vertical plane as the forward edge 24 of the carrier beam 12. In the assembly shown in FIG. 1, all grate plates may be exchanged simultaneously, when the grate carriage is located at its mid-position. For the exchange of grate plate 26, for example, the plate is first disengaged from the grate plate carrier 12 and pushed forward in the left to right direction until the end of the grate plate lies free. Then the grate plate 26 is rotated in its plane by 90° and then because of the width b being smaller than the clearance spacing a in the middle position of the grate carriage, the plate may be tilted out downwardly into a somewhat vertical position. It is not necessary, of course, to enter the hot gas chamber of the cooler.

By an enlargement of the clearance distance a by return of the grate carriage with the movable carrier beam 12 into its rear dead point position, the demounting area or mounting area of the grate plate 26 will not be enlarged, as the system spacing which extends from the lower edge of the downwardly extending flange portions 21 and 22 to the rear end of the row of plates fixed on the grate plate carrier 11 remains unaltered. When the grate plates are extended rearwardly over their respective carrier beams, then, for example, before removal of the grate plate 26, the front grate plate 27 in each case must be released first from its carrier beam 11 and pushed forwardly. The clearance distance a could accordingly still be decreased further so that the grate plate 26 may be moved diagonally through the opening thus provided downwardly.

Figure 2:
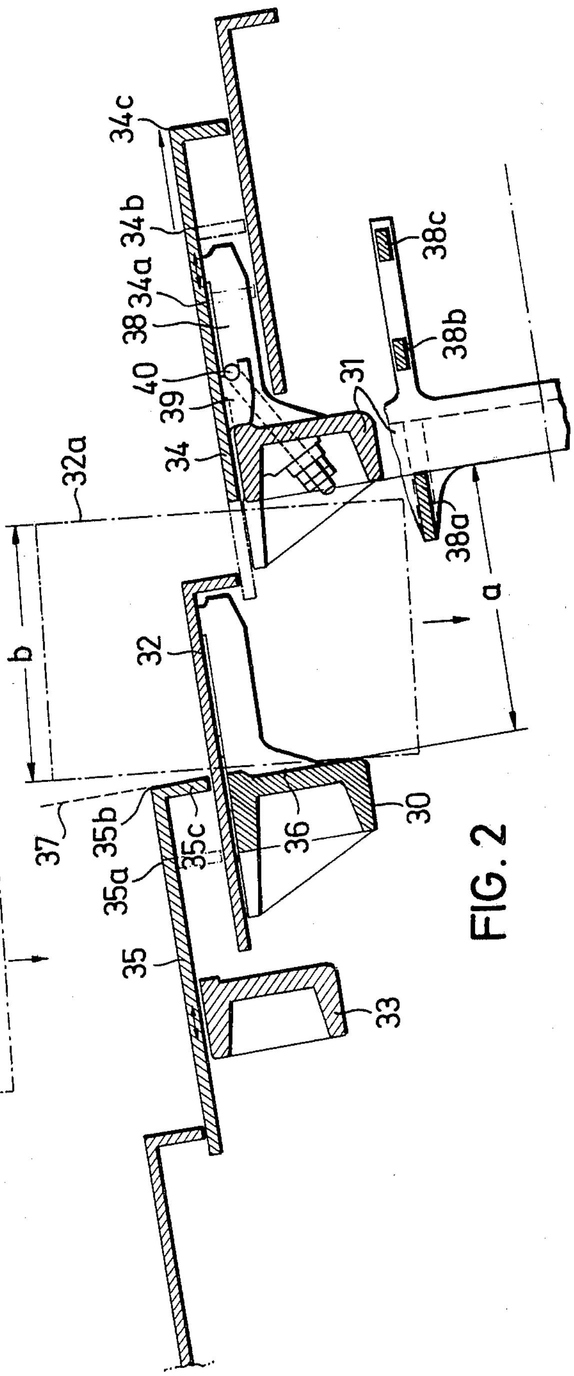
FIG. 2 is a somewhat diagrammatic view mostly in cross-section showing the manner in which a stationary grate plate of a grate cooler can be exchanged with a spacing system somewhat different from that shown in FIG. 1.

While in the embodiment shown in FIG. 1, the middle position of the thrust frame or grate carriage, the grate plate width b is smaller than the clearance spacing a in the embodiment shown in FIGS. 2 and 3, in the middle position of the thrust frame, the width of the plate b is greater than the clearance spacing a, and an exchange of the grate plates from below is possible only in an end position of the frame. In this embodiment, as shown in FIG. 2, the clearance spacing between two adjacent grate plate beams 30 and 31 exceeds the width of the grate plate b only in the front dead point position of the reciprocating beam. In FIG. 2 there is shown a grate plate 32 fixed on a stationary carrier beam 30. The grate carriage is driven into its front or right hand dead point position until the movable carrier beams 31 and 33 assume their designated positions. In this connection, the front edge **34*a* of the grate plate 34 which is fixed on the movable carrier beam 31 is pushed forward into its front end position illustrated at the dash lines of 34*b*. At the same time, the grate plate 35 which is fixed to the movable carrier beam 33 is pulled forward with its front edge from the middle position 35*a* into a front end position illustrated at 35*b*. The downwardly facing flange portion 35*c* of each grate plate 35 then lies in the same plane 37 indicated by dotted lines, when the reciprocating grate plate carriers 31 and 33 are located at their front dead point position. As in the embodiment shown in FIG. 2, the grate plates overlap with their ends extending rearwardly over the respective carrier beams. For the demounting of a stationary grate plate 32, the next forward grate plate 34 is released and pushed forward into a position 34*c* until the next rearwardly projecting grate plate end no longer projects over the carrier beam 31. Thereafter, the grate plate 32 is released from the carrier beam 36 and pushed forward until its end lies free. After this, the grate plate 32 is rotated approximately in its plane by 90° and in a somewhat vertical direction into the position 32*a*** and tilted out downwardly through the clearance distance a which is greater than the plate width b. As in the case of the previous embodiment, the exchange of the plate is accomplished solely from below the cooler grate.

FIG. 2 illustrates a carrier beam 31 and additional carrier beams to which carrier fingers 38 are attached. The beams in the carrier finger may form a one-piece casting and support the two marginal edges of the grate plate. The lower side of the grate plate 34 as well as the other grate plates have two fastening hooks 39 arranged in pairs in which the head of a T-bolt 40 is engaged which bolt has its other end releasably fixed on the carrier beam 31. As is apparent from the showing of FIG. 2, the carrier finger 38 at its lower portion has three supporting surfaces 38*a*, 38*b* and 38*c* against which the lower marginal edge of the carrier plate 34 is pressed by means of the bolts 40. In this manner, all the grate plates are fixed to their grate plate carriers.

Figure 3:
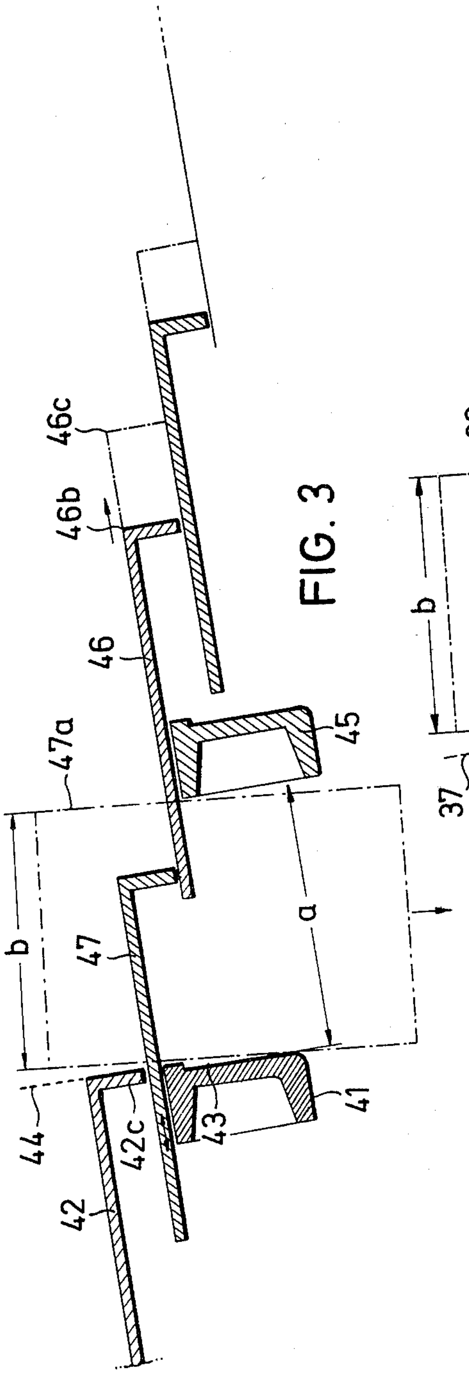
FIG. 3 is a diagrammatic view mostly in cross-section illustrating the exchange of a movable grate plate from the grate cooler of FIG. 2.

FIG. 3 illustrates the position for exchanging the grate plate in the other extreme position of the thrust frame or grate carriage assembly. In that particular drawing, the grate carriage with the movable carrier beam 41 fixed thereon as well as other movable carrier beams is driven to the left into its rear dead point position. When the reciprocable grate plate carriers are located in this rear dead point position, the flange portion 42*c* of each stationary grate plate has its forward edge located in an adjacent limiting plane 43 of the next clearance space a viewed in the direction of grate feed, and lying in a straight line 44. Then the stationary grate plate 46 fixed on the stationary carrier beam 45 is released from the carrier beam and pushed forward from its position 46*b* into a position 46*c* shown in dotted outline, until the end of the grate plate 46 no longer projects over the carrier beam 45. Subsequently, the movable grate plate 47 to be removed is released from the movable carrier beam 41 and pushed forward far enough so that its end lies free. Then the grate plate 47 is rotated approximately in its own plane by 90° and directed into an approximately vertical position shown by the dashed outline 47*a*, whereupon it is tilted out downwardly through the clearance space a. This exchange of the movable grate plate 47 is possible because the clearance space a in the left-hand or rear-end portion of the thrust frame or grate carriage is greater than the width b of the grate plate.

The mounting of the stationary grate plate 32 of FIG. 2, as well as the movable grate plate 47 of FIG. 3 takes place in each instance in reversed sequence from that described and, in both cases, occurs from below the cooler grate.

The readily exchangeable grate system described is not limited for utilization in the cooling of cement clinkers, but it may also be used for the cooling, reheating or calcining of all solid materials, whether lime, dolomite, inter pellets, or the like.

I claim as my invention:

1. A stepped grate-type cooler for particulate material comprising a plurality of spaced grate plate carriers, alternate carriers being stationary and the carriers positioned between the stationary carriers being reciprocable relative thereto between a first position in which each of said reciprocable carriers is in close proximity to an adjoining carrier and a second position in which each of said reciprocable carriers is farthest removed from said adjoining stationary carrier, each of said grate plate carriers including transversely extending carrier beams with integral carrier fingers extending therefrom in the direction of conveyance of said material, a plurality of grate plates respectively carried by said carrier fingers and a means for releaseably connecting said grate plates to respective carriers, said grate plates lying flat against said carrier fingers and having depending flange portions extending against the front ends of said carrier fingers, each grate plate having a longitudinal axis positioned in the direction of reciprocal movement of said carriers when said grate is supported thereby, the width of a grate plate along a lateral axis thereof being sufficient to span across the spacing between laterally adjacent fingers so as to be supported thereby, each said grate plate and respective supporting fingers overlapping an adjacent downstream grate and fingers, the clearance between a stationary carrier beam and a reciprocable carrier beam being greater than the width of each of said grate plates when said reciprocable carriers are in a mid-position between said first and second positions of said reciprocable carrier such that each grid plate can be removed from said carriers and rotated by 90° about its longitudinal axis and positioned vertically in said clearance such that the longitudinal axis of said grate is perpendicular to the direction of reciprocal movement of said carriers and said lateral axis is substantially parallel to said direction of reciprocal movement for downward removal through said clearance.

2. A method for removing a grate plate from a stepped cooler for cooling heated particulate material, said cooler having a plurality of alternating stationary and reciprocable grate plate carriers each having a plurality of integral carrier fingers extending therefrom in a direction of conveyance of said material for supporting a grate plate having a width which spans laterally adjacent carrier fingers and a means for releaseably connecting said grate plates to respective carriers, each grate plate extending along its longitudinal axis from a forward downstream end of carrier fingers supporting the grate plate to a rear end of said carrier fingers, each said grate plate and respective supporting fingers overlapping an adjacent downstream grate and fingers, said reciprocable carriers being movable between a first position in close proximity to an adjoining stationary carrier and a second position farthest removed from said adjoining stationary carrier, and each grate plate having a width along a lateral axis thereof which is less than the clearance between a stationary carrier and a reciprocable carrier at a mid-position between said first position and said second position, said method comprising the steps of:

releasing a grate to be removed and the grate immediately downstream thereof from their respective carriers;

moving the carrier for said grate to be removed to said mid-position;

moving said immediately downstream grate downstream until a rearward end thereof clears said clearance;

pushing said grate to be removed upwardly from below said grate to be removed until the longitudinal axis of said grate reaches a substantially vertical position perpendicular to the direction of reciprocal movement of said carriers and the lateral axis thereof is substantially parallel to said direction of reciprocal movement;

rotating said grate to be removed 90° about its longitudinal axis; and lowering the rotated grate beneath said carrier fingers through said clearance between adjoining grate plate carriers.

* * * * *